United States Patent
Li et al.

(10) Patent No.: US 12,133,286 B2
(45) Date of Patent: Oct. 29, 2024

(54) METHOD AND APPARATUS FOR IDENTIFYING USER EQUIPMENT CAPABILITY IN SIDELINK TRANSMISSION

(71) Applicant: FUJITSU LIMITED, Kawasaki (JP)

(72) Inventors: Guorong Li, Beijing (CN); Jian Zhang, Beijing (CN); Pengyu Ji, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 418 days.

(21) Appl. No.: 17/487,059

(22) Filed: Sep. 28, 2021

(65) Prior Publication Data
US 2022/0014901 A1 Jan. 13, 2022

Related U.S. Application Data

(63) Continuation of application No. PCT/CN2019/085334, filed on Apr. 30, 2019.

(51) Int. Cl.
*H04W 4/00* (2018.01)
*H04W 8/22* (2009.01)
*H04W 48/16* (2009.01)

(52) U.S. Cl.
CPC ............ *H04W 8/22* (2013.01); *H04W 48/16* (2013.01)

(58) Field of Classification Search
CPC ............................... H04W 8/22; H04W 48/16
USPC ........................................................ 370/328
See application file for complete search history.

(56) References Cited

U.S. PATENT DOCUMENTS

| | | | |
|---|---|---|---|
| 2014/0112258 A1 | 4/2014 | Vanderveen | |
| 2016/0150390 A1 | 5/2016 | Chen et al. | |
| 2017/0111754 A1 | 4/2017 | Baghel et al. | |
| 2018/0084481 A1 | 3/2018 | Wang et al. | |
| 2022/0124466 A1* | 4/2022 | Ali | H04W 4/40 |
| 2022/0159628 A1* | 5/2022 | Bangolae | H04W 72/04 |
| 2023/0017902 A1* | 1/2023 | Vargas | H04W 76/23 |

FOREIGN PATENT DOCUMENTS

| | | |
|---|---|---|
| CN | 104105155 A | 10/2014 |
| CN | 104737616 A | 6/2015 |
| CN | 106162511 A | 11/2016 |
| CN | 106604341 A | 4/2017 |

OTHER PUBLICATIONS

International Search Report and Written Opinion of the International Searching Authority issued by the China National Intellectual Property Administration for the International Patent Application No. PCT/CN2019/085334, mailed on Jan. 19, 2020, with a partial English translation.

(Continued)

*Primary Examiner* — Temica M Beamer
(74) *Attorney, Agent, or Firm* — Myers Wolin, LLC

(57) ABSTRACT

A method and apparatus for identifying a user equipment capability in sidelink transmission. A UE capability of a destination UE is identified by using a specific UE identity, and a transmitting end UE is facilitated to provide configuration not exceeding a UE capability according to the UE capability of a destination UE and maintain information on the destination UE, thereby providing a mechanism for identifying a UE capability.

14 Claims, 14 Drawing Sheets

(56) References Cited

OTHER PUBLICATIONS

Session Chair (Intel Corporation), "Report from session on LTE V2X and NR V2X", Agenda Item: 13.1.7, 3GPP TSG-RAN WG2 Meeting #105bis, R2-190xxxx, Xi'an, China, Apr. 8-12, 2019.

First Notification of Office Action and Search Report issued by the China National Intellectual Property Administration for corresponding Chinese Patent Application No. 201980095171.8, mailed on Nov. 24, 2023, with an English translation.

Ericsson, "On PC5-RRC for unicast NR V2X", Agenda Item: 11.4.4, 3GPP TSG-RAN WG2 #105bis, R2-1904717, Xi'an, China, Apr. 8-12, 2019.

Second Notification of Office Action and Search Report issued by the China National Intellectual Property Administration for corresponding Chinese Patent Application No. 201980095171.8, mailed on May 18, 2024, with an English translation.

Qualcomm Incorporated, "Unicast link establishement solution for eV2X", Agenda Item: 6.6, 3GPP SA WG2 Meeting #128bis, S2-188564 (was S2-1885587 was S2-188076), Sophia Antipolis, France, Aug. 20-24, 2018.

Notice of Reasons for Refusal issued by the Japan Patent Office for corresponding Japanese Patent Application No. 2023-144849, mailed on Sep. 10, 2024, with an English translation.

Ericsson, "TS 23.287 PC5 Layer 2 ID handling", Agenda Item: 6.6, 3GPP TSG SA WG2 Meeting #132, S2-1903370 (revision of S2-19XXXX), Xi'An, P.R.China, Apr. 8-12, 2019.

3GPP TR 23.786 V16.0.0, "3rd Generation Partnership Project , Technical Specification Group Services and System Aspects; Study on architecture enhancements for the Evolved Packet System (EPS) and the 5G System (5GS) to support advanced V2X services (Release 16)" Mar. 2019.

Huawei et al., "Analysis on connection establishment procedure for SL unicast", Agenda Item: 11.4.4, 3GPP TSG- RAN WG2 #105bis, R2-1904080, Xi'an, China, Apr. 8-12, 2019.

* cited by examiner

METHOD AND APPARATUS FOR IDENTIFYING USER EQUIPMENT CAPABILITY IN SIDELINK TRANSMISSION

CROSS-REFERENCE TO RELATED APPLICATION

This application is a continuation application of International Application PCT/CN2019/085334 filed on Apr. 30, 2019 and designated the U.S., the entire contents of which are incorporated herein by reference.

TECHNICAL FIELD

This disclosure relates to the field of communications, and in particular to a method and apparatus for identifying a user equipment capability in sidelink transmission.

BACKGROUND

Vehicle communication services are called V2X services. V2X services may include multiple types, such as vehicle-to-vehicle (V2V) services, vehicle-to-infrastructure (V2I) services, and vehicle-to-pedestrian (V2P) services, etc. V2X services may be provided via a PC5 interface and/or a Uu interface. V2X services transmitted via a PC5 interface may be provided by V2X sidelink communication. The V2X sidelink communication is a communication mode in which user equipments (UEs) may directly communicate with each other via a PC5 interface. In LTE (long term evolution) or NR (New Radio), a UE supports the above communication modes when it is within or outside coverage of a network.

In existing V2X communications, data transmission is performed between vehicles taken as user equipments (UEs) on a sidelink via a PC5 interface, and data transmission is performed between a UE and a network equipment (NE) on uplink and downlink via a Uu interface. On the sidelink, a UE transmitting data is referred to as a transmitting end UE or a source UE, and a UE receiving data is referred to as a receiving end UE or a destination UE.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

At present, it is agreed in 3GPP (Third Generation Partnership Project) that a UE context is stored for a destination UE, and a sidelink transmission UE context (SL UE context) may at least include a UE capability of sidelink transmission of the destination UE, and whether access layer (AS layer) configuration information is also included in the sidelink transmission UE context has not been determined. In addition, it is deemed that the UE may store the UE capability of the destination UE for newly arrived services between two UEs in unicast, such as newly arrived unicast services; and synchronization between SL UE contexts between two UEs is supported via PC5-RRC connection.

It was found by the inventors that in LTE V2X, there exists a correspondence relationship between a destination layer-2 identity (destination L2 ID) and a V2X service type. In NR V2X, whether there exists a correspondence relationship between a cast mode (including unicast, groupcast and broadcast) and the destination layer-2 identity is under discussion. In discussion of SA2, more than one unicast services or unicast links between a UE and a peer UE may possibly use identical or different source L2 IDs. Therefore, for example, when there exist more than one unicast services or unicast links between two UEs, it is currently uncertain whether the source layer-2 identity and/or the destination layer-2 identity correspond(s) to the destination UE one-to-one, hence, there is a need to solve a problem of how to identify a UE capability of a destination UE.

Embodiments of this disclosure provide a method and apparatus for identifying a user equipment capability in sidelink transmission, in which a UE capability of a destination UE is identified by using a specific UE identity, thereby providing an effective mechanism for identifying a UE capability.

According to a first aspect of the embodiments of this disclosure, there is provided a method for identifying a user equipment capability (UE capability) in sidelink transmission, applicable to a first user equipment side, the method including: identifying a user equipment capability of a second user equipment by using one of the following user equipment identities (UE IDs): a layer 2 identity (L2 ID), an identity pair consisting of a source layer 2 identity (source L2 ID) and a destination layer 2 identity, an identity of an access stratum (AS layer), a link identity, and an identity used by the second user equipment in transmitting a PC5-RRC message; wherein the sidelink transmission is sidelink transmission between the first user equipment and the second user equipment.

According to a second aspect of the embodiments of this disclosure, there is provided a method for identifying a user equipment capability (UE capability) in sidelink transmission, applicable to a second user equipment side, the method including: providing one of the following user equipment identities (UE IDs) to a first user equipment, so that the first user equipment uses the user equipment identity to identify a user equipment capability of the second user equipment: a layer 2 identity (destination L2 ID), an identity pair consisting of a source layer 2 identity (source L2 ID) and a destination layer 2 identity, a link identity, an identity of an access layer (AS), and an identity used by the second user equipment in transmitting a PC5-RRC message; wherein the sidelink transmission is sidelink transmission between the first user equipment and the second user equipment.

According to a third aspect of the embodiments of this disclosure, there is provided an apparatus for identifying a user equipment capability (UE capability) in sidelink transmission, applicable to a first user equipment side, the apparatus including: a first identifying unit configured to identify a user equipment capability of a second user equipment by using one of the following user equipment identities (UE IDs): a layer 2 identity (L2 ID), an identity pair consisting of a source layer 2 identity (source L2 ID) and a destination layer 2 identity, an identity of an access layer (AS layer), a link identity, and an identity used by the second user equipment in transmitting a PC5-RRC message; wherein the sidelink transmission is sidelink transmission between the first user equipment and the second user equipment.

According to a fourth aspect of the embodiments of this disclosure, there is provided an apparatus for identifying a user equipment capability (UE capability) in sidelink transmission, applicable to a second user equipment side, the apparatus including: a first providing unit configured to provide one of the following user equipment identities (UE IDs) to a first user equipment, so that the first user equipment uses the user equipment identity to identify a user equipment capability of the second user equipment: a layer 2 identity (destination L2 ID), an identity pair consisting of a source layer 2 identity (source L2 ID) and a destination layer 2 identity, a link identity, an identity of an access layer (AS), and an identity used by the second user equipment in transmitting a PC5-RRC message; wherein the sidelink transmission is sidelink transmission between the first user equipment and the second user equipment.

According to a fifth aspect of the embodiments of this disclosure, there is provided a terminal equipment, including the apparatus as described in the third or the fourth aspect.

According to a sixth aspect of the embodiments of this disclosure, there is provided a communication system, including the terminal equipment as described in the fifth aspect.

According to a seventh aspect of the embodiments of this disclosure, there is provided a computer readable program, which, when executed in an apparatus for identifying a user equipment capability (UE capability) in sidelink transmission or a user equipment, will cause the apparatus for identifying a user equipment capability (UE capability) in sidelink transmission or the user equipment to carry out the method for identifying a user equipment capability (UE capability) in sidelink transmission described in the first or the second aspect.

According to an eighth aspect of the embodiments of this disclosure, there is provided a computer storage medium, including a computer readable program, which will cause an apparatus for identifying a user equipment capability (UE capability) in sidelink transmission or a user equipment to carry out the method for identifying a user equipment capability (UE capability) in sidelink transmission described in the first or the second aspect.

An advantage of the embodiments of this disclosure exists in that a UE capability of a destination UE is identified by using a specific UE identity, and a transmitting end UE is facilitated to provide configuration not exceeding a UE capability according to the UE capability of a destination UE and maintain information on the destination UE, thereby providing an effective mechanism for identifying a UE capability.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
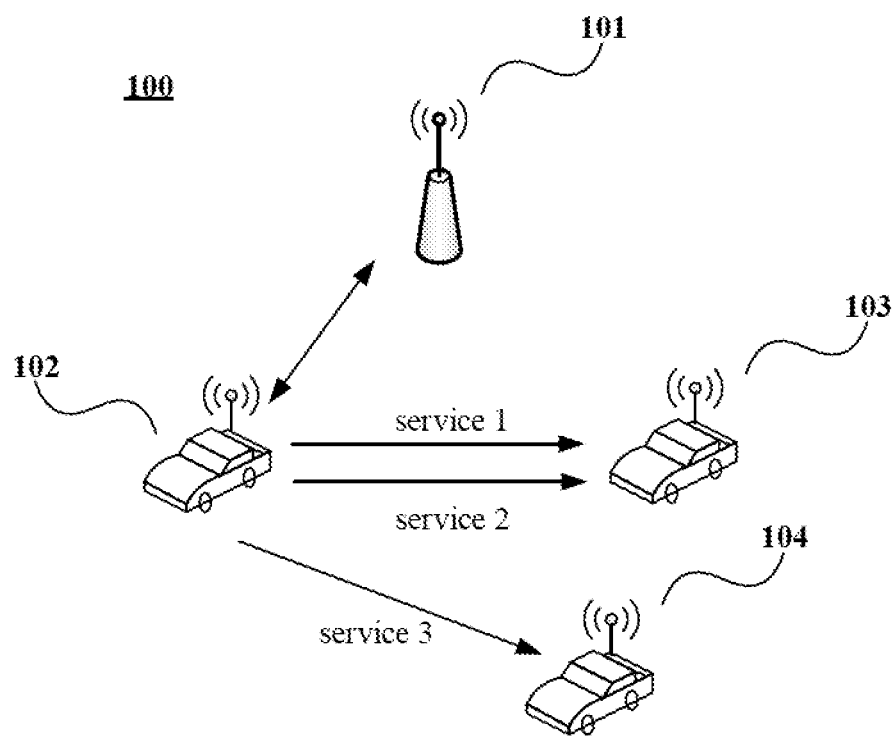
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, "multiple" or "multiple types" refers to at least two or at least two types.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network equipment", for example, refers to an equipment in a communication system that accesses a terminal equipment to the communication network and provides services for the terminal equipment. The network equipment may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

In the embodiments of this disclosure, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment" or "terminal equipment (TE)" refers to, for example, an equipment accessing to a communication network and receiving network services via a network equipment, and may also be referred to as "terminal equipment (TE)". The user equipment may be fixed or mobile, and may also be referred to as a mobile station (MS), a terminal, a subscriber station (SS), an access terminal (AT), or a station, etc.

In the embodiments of this disclosure, the user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network equipment are taken as examples is schematically shown. As shown in FIG. 1, a communication system 100 may include a network equipment 101 and user equipments 102, 103 and 104. For example, the user equipments 102, 103 and 104 are vehicles. In the embodiments of this disclosure, the network equipment 101 is optional.

In the embodiment of this disclosure, existing traffics or traffics that may be implemented in the future may be performed between the network equipment 101 and the user equipments 102, 103 and 104. For example, such traffics may include but not limited to enhanced mobile broadband (eMBB), massive machine type communication (MTC), and ultra-reliable and low-latency communication (URLLC), etc.

Traffics on a sidelink may be performed between the user equipments 102, 103 and between the user equipments 102, 104. For example, the services include but not limited to V2X services, D2D services. For example, the user equipment 102 is a first user equipment UE1, that is, the transmitting end UE, the user equipment 103 is a second user equipment UE2, the user equipment 104 is a third user equipment UE3, and UE2 and UE3 are receiving end UEs.

For example, UE1 and UE2 perform two V2X services, namely service 1 and service 2, and UE1 and UE3 perform one V2X service, namely service 3. UE contexts of destination UEs, that is, UE contexts of the destination UE2 and destination UE3, needs to be stored in UE1. The UE contexts include UE capabilities of the UEs, and may also include corresponding AS layer configuration (FFS).

Figure 2:
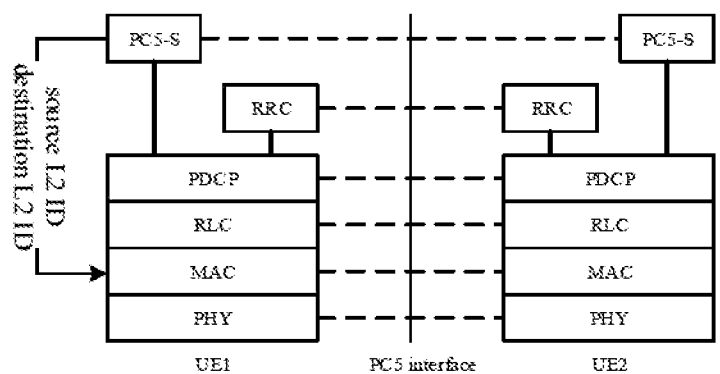
FIG. 2 is a schematic diagram of a protocol stack of a PC5 interface of the embodiment of this disclosure.

FIG. 2 is a schematic diagram of a protocol stack of a PC5 interface of the embodiment of this disclosure. As shown in FIG. 2, communications are performed via a PC5-signaling (PC5-S) message between PC5-signaling layers (PC5-S layers) or V2X layers or V2X application layers taken as upper layers of UE1 and UE2 constituting a sidelink. In a transmitting end UE (for example, UE1), an upper layer will notify an MAC layer of a source L2 ID of the transmitting end UE and a destination L2 ID of a receiving end UE. In addition, the protocol stack may include an SDAP protocol layer, which is, for example, located below a PC5-S layer and above a PDCP layer (not shown).

In the embodiment of this disclosure, the upper layer may be an application layer or a V2X layer or a PC5-S layer. Furthermore, an access stratum (AS layer) may include at least one of an RRC layer, an SDAP layer, a PDCP layer, an RLC layer, an MAC layer and a PHY layer.

Embodiment 1

Figure 3:
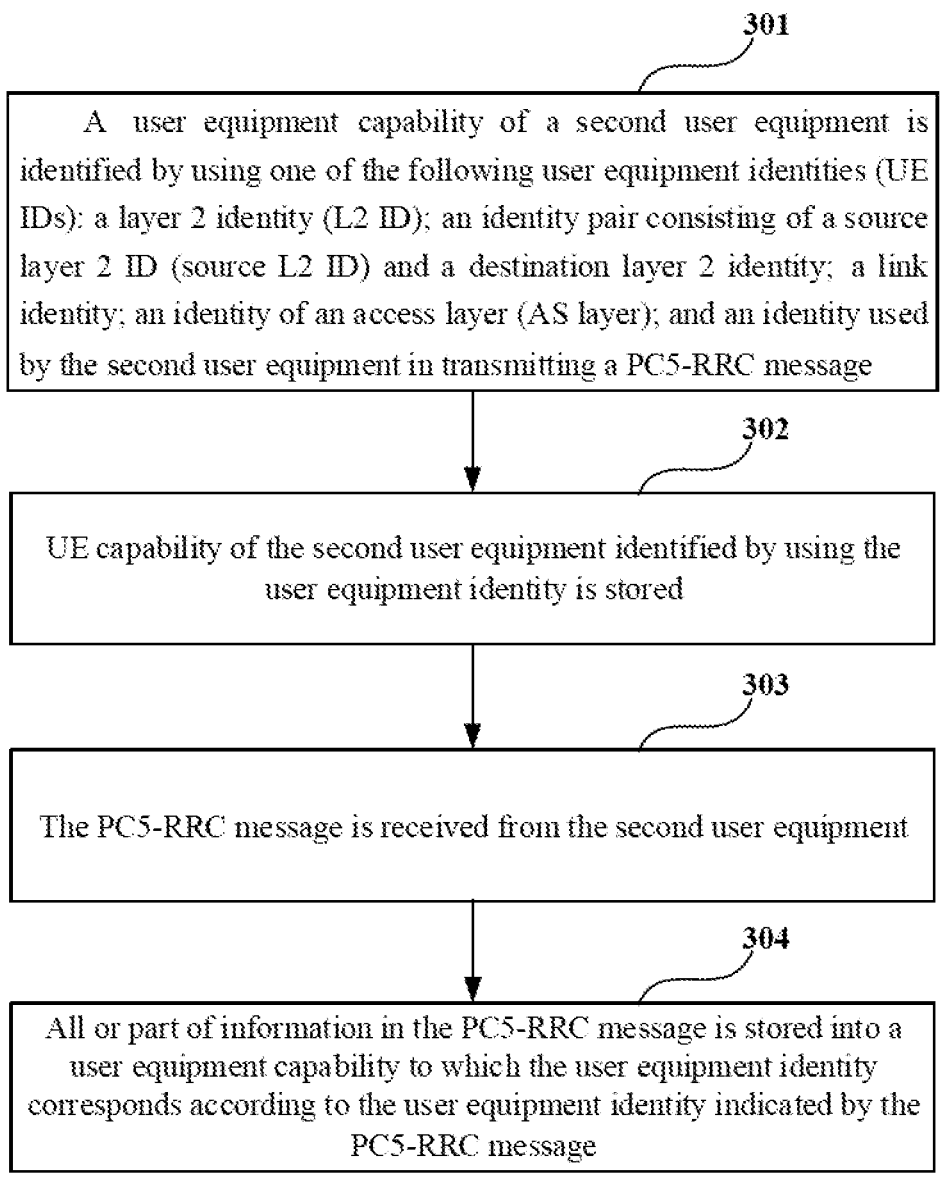
FIG. 3 is a schematic diagram of the method for identifying a user equipment capability (UE capability) in sidelink transmission of Embodiment 1 of this disclosure.

The embodiment of this disclosure provides a method for identifying a user equipment capability in sidelink transmission, applicable to a first user equipment side. FIG. 3 is a schematic diagram of the method for identifying a user equipment capability in sidelink transmission of Embodiment 1 of this disclosure. As shown in FIG. 3, the method includes:

Step 301: a user equipment capability of a second user equipment is identified by using one of the following user equipment identities (UE IDs):
  a layer 2 identity (L2 ID);
  an identity pair consisting of a source layer 2 ID (source L2 ID) and a destination layer 2 identity;
  a link identity;
  an identity of an access layer (AS layer); and
  an identity used by the second user equipment in transmitting a PC5-RRC message;
  wherein the sidelink transmission is sidelink transmission between the first user equipment and the second user equipment.

Thus, the UE capability of the destination UE is identified by using a specific UE identity, and a transmitting end UE is facilitated to provide configuration not exceeding a UE capability according to the UE capability of the destination UE and maintain information on the destination UE, thereby providing an effective mechanism for identifying a UE capability.

In this embodiment, sidelink transmission may be performed between the first user equipment and the second user equipment. For example, the first user equipment is a transmitting end UE, denoted by UE1, and the second user equipment is a receiving end UE, denoted by UE2.

In this embodiment, the link identity is, for example, a PC5 link identity.

In this embodiment, the method may further include:

Step 302: UE capability of the second user equipment identified by using the user equipment identity is stored;

In this embodiment, the method may further include:

Step 303: the PC5-RRC message is received from the second user equipment; and

Step 304: all or part of information in the PC5-RRC message is stored into a user equipment capability to which the user equipment identity corresponds according to the user equipment identity indicated by the PC5-RRC message.

In this embodiment, the PC5-RRC message contains, for example, UE capability information of the second user equipment.

In this embodiment, the user equipment identity may be provided by one of the first user equipment, the second user equipment and the network equipment.

In this embodiment, the user equipment identity may be provided by an upper layer or an access stratum (AS layer) of the first user equipment or the second user equipment.

In this embodiment, the user equipment identity may be explicitly or implicitly included in the PC5-S message or PC5-RRC message.

For example, in a case of being explicit, the PC5-S message or PC5-RRC message directly contains the user equipment identity; in a case of being implicit, the PC5-S message or PC5-RRC message does not directly contain the user equipment identity, instead, it needs to be obtained by parsing an ID to which the message corresponds. For example, the user equipment identity is included by the destination UE in a subheader of an MAC PDU to which the message corresponds; for example, it is taken as a source L2 ID.

A method for acquiring a user equipment identity for identifying a user equipment capability of the second user equipment and a process for identifying in this embodiment shall be described below by examples 1-3. For ease of description, the first user equipment serving as a transmitting end UE is referred to as UE1, and the second user equipment serving as the destination UE is referred to as UE2.

Example 1

The user equipment identity used to identify the user equipment capability of UE2 is a layer 2 identity or an identity pair consisting of a source layer 2 identity and a destination layer 2 identity or a link identity, provided by an upper layer of UE1 or UE2. In this embodiment, a layer 2 identity is taken as an example for description. For an identity pair, a processing method is similar.

Example 1.1

For a case where an upper layer uses one layer 2 identity for more than one links of a UE, or uses more than one layer 2 identities for more than one links of a UE, but it is deemed that different layer 2 identities correspond to different destination UEs.

For example, for two unicast services or unicast links from UE1 to UE2, source layer 2 identities allocated to the two unicast services or unicast links in UE2 are identical, that is, for UE1, destination layer 2 identities of the two unicast services or unicast links are identical; and furthermore, for UE1, source layer 2 identities used by more than one unicast services or unicast links may be identical or different.

For another example, for two unicast services or unicast links from UE1 to UE2, source layer 2 identities allocated to the two unicast services or unicast links in UE2 are different, that is, for UE1, destination layer 2 identities of the two unicast services or unicast links are different; and the two destination layer 2 identities are taken as two destination UEs for processing.

Figure 4:
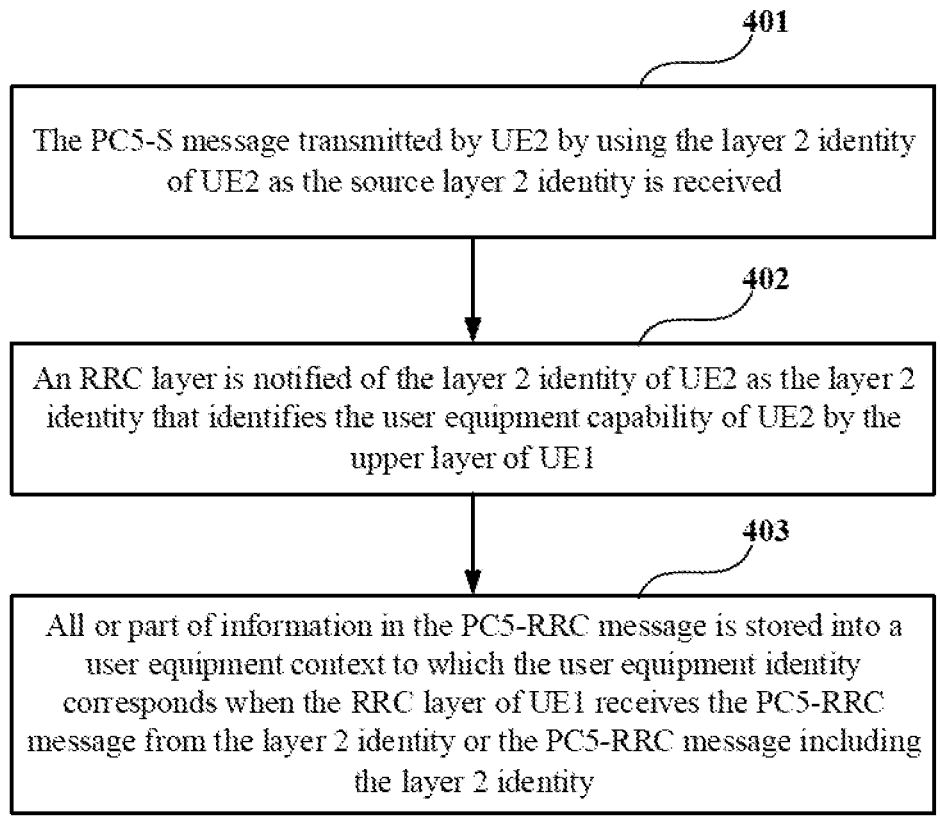
FIG. 4 is a schematic diagram of the identity method of Example 1.1 of Embodiment 1 of this disclosure.

FIG. 4 is a schematic diagram of the identity method of Example 1.1 of Embodiment 1 of this disclosure, which is applicable to a UE1 side. As shown in FIG. 4, the method includes:

Step 401: the PC5-S message transmitted by UE2 by using the layer 2 identity of UE2 as the source layer 2 identity is received;

Step 402: an RRC layer is notified of the layer 2 identity of UE2 as the layer 2 identity that identifies the user equipment capability of UE2 by the upper layer of UE1; and Step 403: all or part of information in the PC5-RRC message is stored into a user equipment capability to which the source layer 2 identity corresponds when the RRC layer of UE1 receives the PC5-RRC message from the layer 2 identity or the PC5-RRC message including the layer 2 identity.

Figure 5:
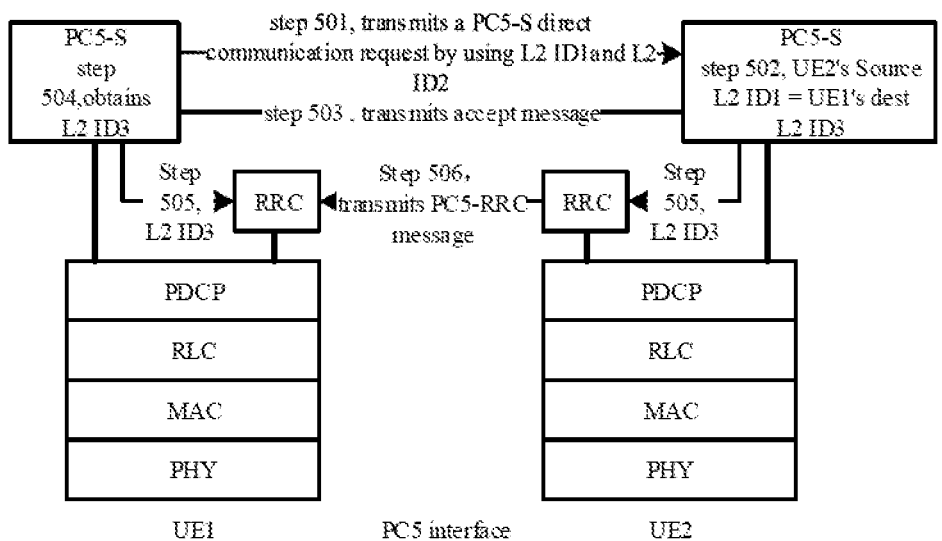
FIG. 5 is a schematic diagram of performing information exchange by a protocol stack of the PC5 interface of Example 1.1 of Embodiment 1 of this disclosure.

FIG. 5 is a schematic diagram of performing information exchange by a protocol stack of the PC5 interface of Example 1.1 of Embodiment 1 of this disclosure. As shown in FIG. 5, in step 501, UE1 transmits to UE2 a PC5-S direct communication request by using the source L2 ID (such as L2 ID1) and a specific destination L2 ID (such as L2 ID2 corresponding to the V2X service type); in step 502, the upper layer of UE2 takes the source L2 ID1 used by UE1 in transmitting the PC5-S direct communication request as a destination layer 2 ID for transmitting a PC5-S direct communication accept message, and determines by itself a source layer 2 ID (such as L2 ID3) used for transmitting the PC5-S direct communication accept message; in step 503, UE2 transmits PC5-S direct communication accept message to UE1; in step 504, the PC5-S layer of UE1 obtains the layer 2 ID of UE2 (i.e. L2 ID3) to which the accept message corresponds; furthermore, UE1 may use L2 ID3 for subsequent communication of unicast services or unicast link signaling and data services to UE2; in step 505, PC5-S layers of UE1 and UE2 respectively notify the layer 2 ID (i.e. L2 ID3) to the RRC layer; in step 506, UE2 transmits a PC5-RRC message, such as including UE capability information, to UE1. Thereafter, after receiving the PC5-RRC message from the layer 2 ID (i.e. L2 ID3), the RRC layer of UE1 stores all or part of the information in the PC5-RRC message into the user equipment capability to which the layer 2 ID corresponds.

Example 1.2

For a case where an upper layer uses more than one layer 2 identities for more than one links of a UE and the more than one layer 2 identities should correspond to one destination.

For example, for two unicast services or unicast links of UE2, source layer 2 identities used for the two unicast services or unicast links in UE2 are different, that is, for UE1, destination layer 2 identities of the two unicast services or unicast links are different.

In this case, the user equipment identity may be one of more than one layer 2 identities or one of more than one identity pairs or one of more than one link identities provided by the upper layer of UE1 or UE2. In this embodiment, description is given by taking one of more than one layer 2 identities is taken as an example. For one of more than one identity pairs and one of more than one link identities, processing methods are similar.

Figure 6:
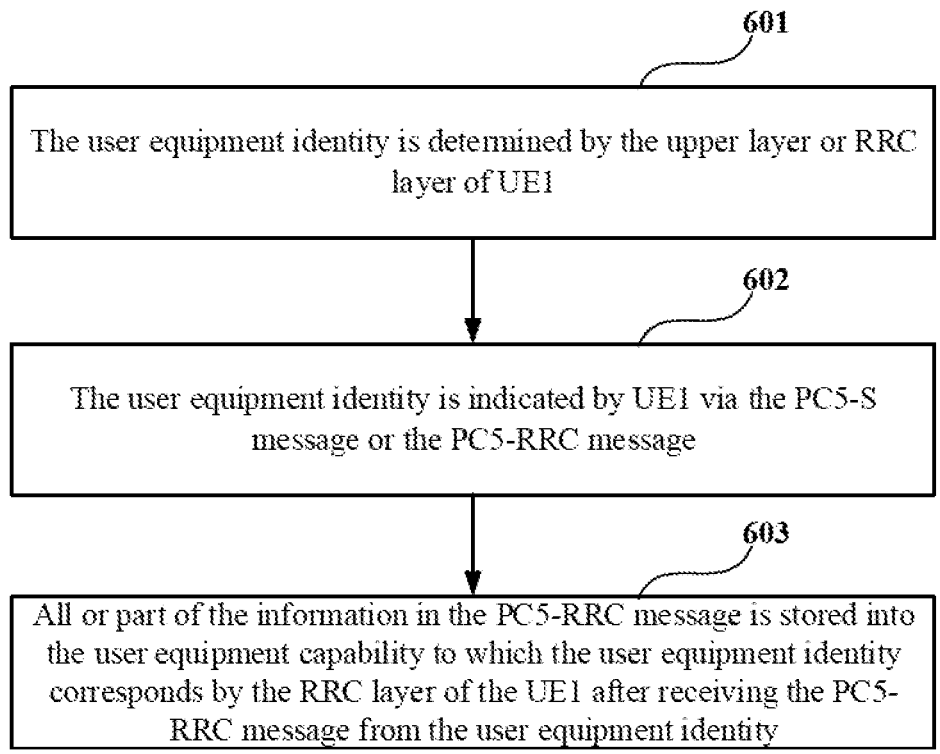
FIG. 6 is a schematic diagram of the identity method of Example 1.2 of Embodiment 1 of this disclosure, applicable to a UE1 side.

FIG. 6 is a schematic diagram of the identity method of Example 1.2 of Embodiment 1 of this disclosure, applicable to a UE1 side. As shown in FIG. 6, the method includes:

Step 601: the user equipment identity is determined by the upper layer or RRC layer of UE1;

Step 602: the user equipment identity is indicated by UE1 via the PC5-S message or the PC5-RRC message; and Step 603: all or part of the information in the PC5-RRC message is stored into the user equipment capability to which the user equipment identity corresponds by the RRC layer of the UE1 after receiving the PC5-RRC message from the user equipment identity.

Figure 7:
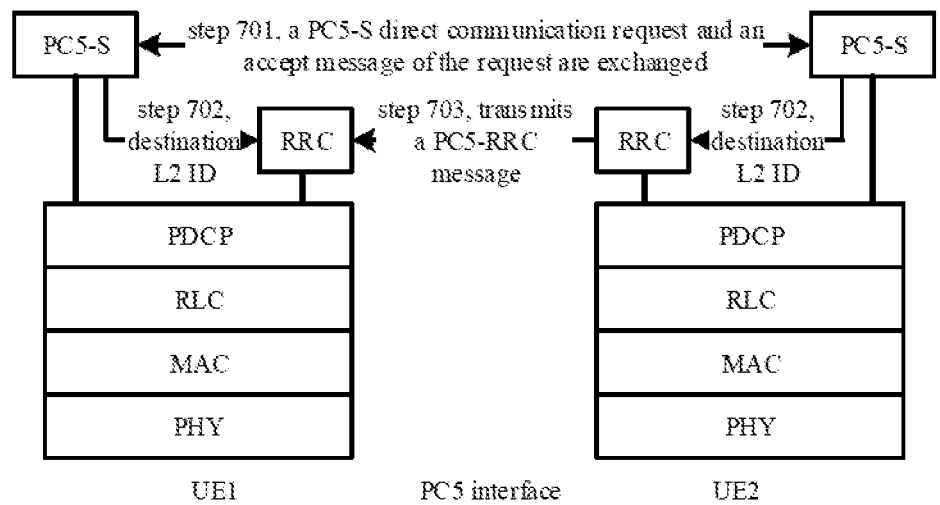
FIG. 7 is a schematic diagram of performing information exchange by the protocol stack of the PC5 interface of Example 1.2 of Embodiment 1 of this disclosure.

FIG. 7 is a schematic diagram of performing information exchange by the protocol stack of the PC5 interface of Example 1.2 of Embodiment 1 of this disclosure, in which the user equipment identity is indicated via the PC5-S message. As shown in FIG. 7, in step 701, a PC5-S direct communication request and an accept message of the request are exchanged between UE1 and UE2, wherein the layer 2 identity used to identify the user equipment capability of UE2 may be contained in the PC5-S message by UE1 or UE2 and indicated to the counterpart. In step 702, the PC5-S layers of UE1 and UE2 respectively notify the RRC layer of the layer 2 identity. In step 703, UE2 transmits a PC5-RRC message to UE1, such as a message containing UE capability information, and the PC5-RRC message explicitly or implicitly contains the layer 2 identity. The RRC layer of UE1 stores all or part of the information in the PC5-RRC message into the user equipment capability to which the layer 2 identity corresponds.

Figure 8:
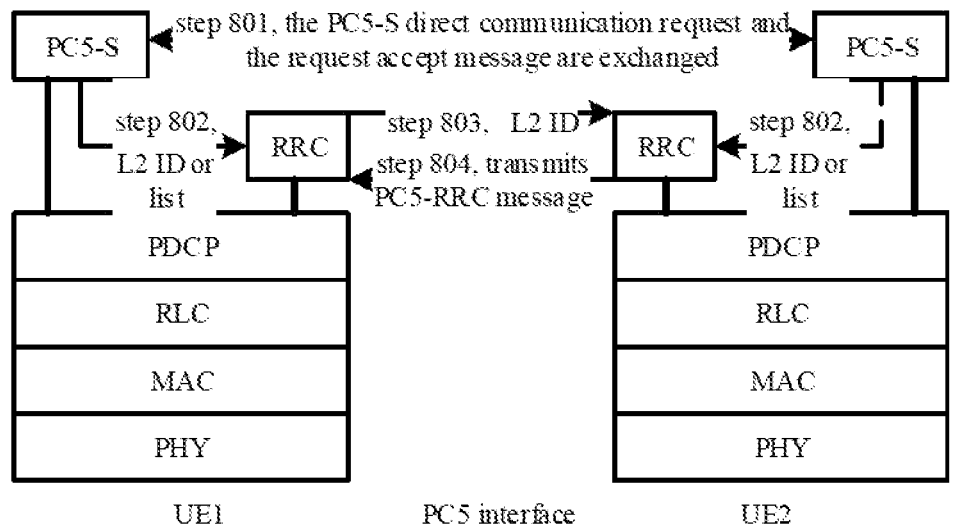
FIG. 8 is another schematic diagram of performing information exchange by the protocol stack of the PC5 interface of Example 1.2 of Embodiment 1 of this disclosure.

FIG. 8 is another schematic diagram of performing information exchange by the protocol stack of the PC5 interface of Example 1.2 of Embodiment 1 of this disclosure, in which the user equipment identity is indicated via a PC5-RRC message. As shown in FIG. 8, in step 801, the PC5-S direct communication request and the request accept message are exchanged between UE1 and UE2; in step 802, the PC5-S layer of UE1 notifies RRC of the layer 2 identity, or the PC5-S layer of UE1 notifies the RRC layer of a list of layer 2 identities; in addition, alternatively, the PC5-S layer of UE2 notifies the RRC layer of the list of layer 2 identities; in step 803, in a case where the RRC layer of UE1 receives the layer 2 identity in step 802, the layer 2 identity is transmitted to UE2 via the PC5-RRC message, and in a case where the RRC layer of UE1 receives the list of layer 2 identities in step 802, the RRC layer of UE1 determines the layer 2 identity and transmits the determined layer 2 identity to UE2 via the PC5-RRC message; in step 804, UE2 transmits the PC5-RRC message to UE1, such as a message containing UE capability information, and the PC5-RRC message explicitly or implicitly contains the layer 2 identity. The RRC layer of UE1 stores all or part of the information in the PC5-RRC message into the user equipment capability to which the layer 2 identity corresponds.

Figure 9:
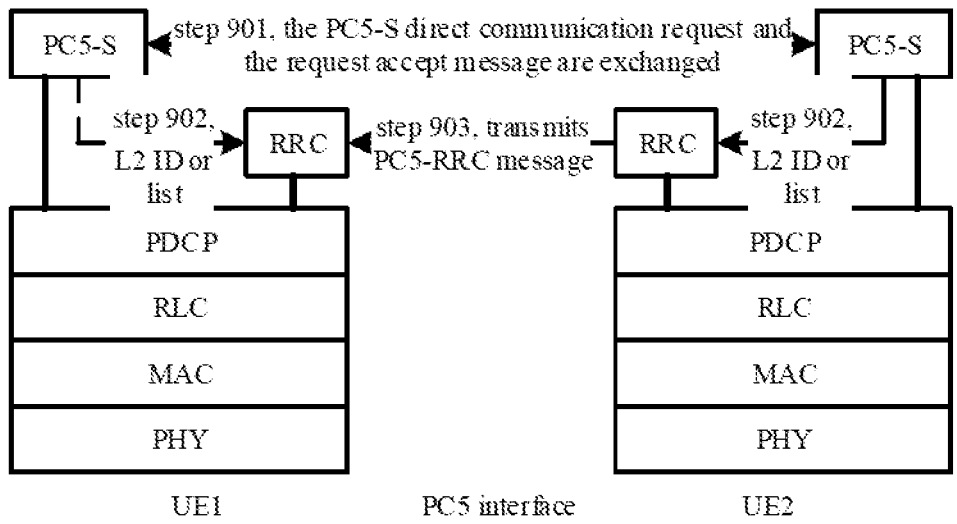
FIG. 9 is a further schematic diagram of performing information exchange by the protocol stack of the PC5 interface of Example 1.2 of Embodiment 1 of this disclosure.

FIG. 9 is a further schematic diagram of performing information exchange by the protocol stack of the PC5 interface of Example 1.2 of Embodiment 1 of this disclosure. As shown in FIG. 9, in step 901, the PC5-S direct communication request and the request accept message are exchanged between UE1 and UE2; in step 902, the PC5-S layer of UE2 notifies RRC of the layer 2 identity, or the PC5-S layer of UE2 notifies the RRC layer of a list of layer 2 identities; in addition, alternatively, the PC5-S layer of UE1 notifies the RRC layer of the list of layer 2 identities; in step 903, UE2 transmits the PC5-RRC message to UE1, such as a message containing UE capability information, and the PC5-RRC message explicitly or implicitly contains the layer 2 identity. The RRC layer of UE1 stores all or part of the information in the PC5-RRC message into the user equipment capability to which the layer 2 identity corresponds.

In addition, establishing a new link and/or service by the PC5-S after UE1 and UE2 exchanges the UE capability shall be described below.

Figure 10:
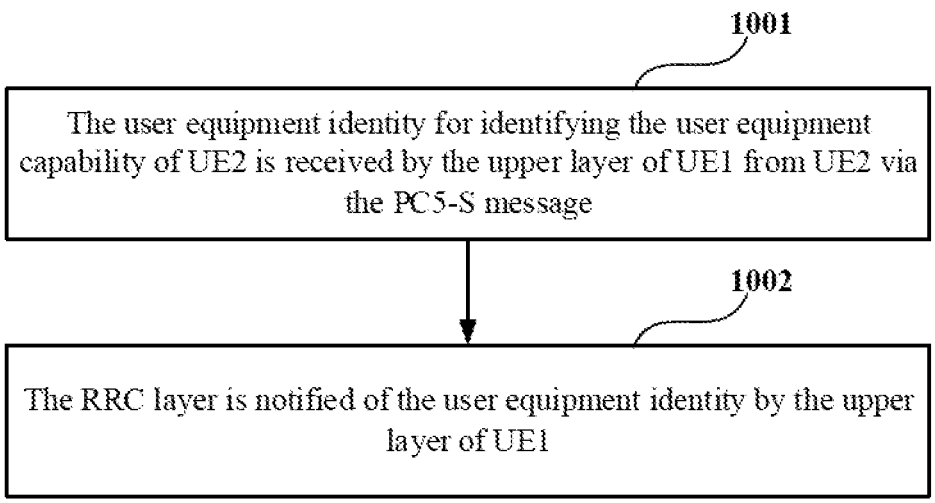
FIG. 10 is another schematic diagram of the identity method of Example 1.2 of Embodiment 1 of this disclosure.

FIG. 10 is another schematic diagram of the identity method of Example 1.2 of Embodiment 1 of this disclosure, which is applicable to a UE1 side. As shown in FIG. 10, the method includes:

Step 1001: the user equipment identity for identifying the user equipment capability of UE2 is received by the upper layer of UE1 from UE2 via the PC5-S message; and Step 1002: the RRC layer is notified of the user equipment identity by the upper layer of UE1.

Figure 11:
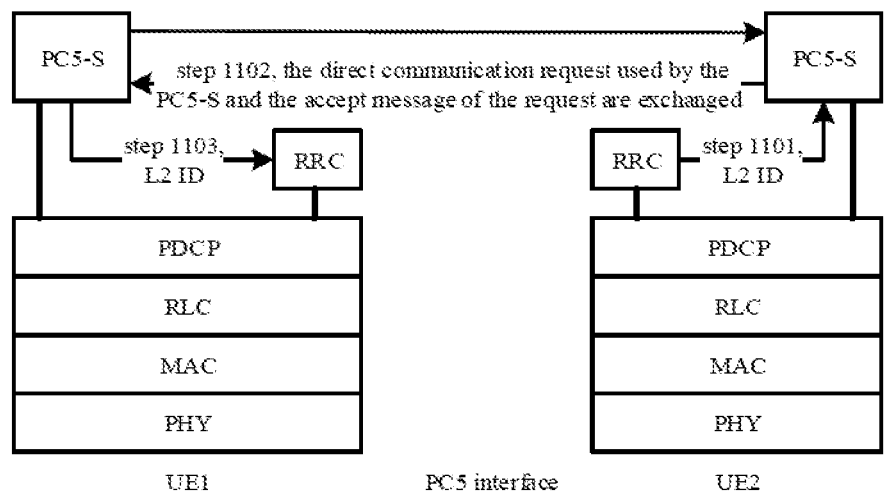
FIG. 11 is still another schematic diagram of performing information exchange by the protocol stack of the PC5 interface of Example 1.2 of Embodiment 1 of this disclosure.

FIG. 11 is still another schematic diagram of performing information exchange by the protocol stack of the PC5 interface of Example 1.2 of Embodiment 1 of this disclosure. As shown in FIG. 11, in step 1101, the RRC layer of UE2 notifies the PC5-S layer of the layer 2 identity used to identify the user equipment capability, or in a case where the PC5-S layer of UE2 already learns the layer 2 identity used to identify the user equipment capability, step 1101 is not included; in step 1102, the direct communication request used by the PC5-S for establishing a new link and/or service and the accept message of the request are exchanged between UE1 and UE2, wherein the layer 2 identity is explicitly included in the PC5-S message by UE2 and indicated to UE1, or UE2 implicitly indicates the layer 2 identity as the source L2 ID to UE1 when UE2 transmits the PC5-S message to UE1; in step 1103, the PC5-S layer of UE1 notifies the layer 2 identity to the RRC layer, and alternatively, the newly established link and/or service information together with the layer 2 identity may be notified to the RRC layer for the RRC layer to update the user equipment capability.

Example 2

The user equipment identity used to identify the user equipment capability of UE2 is an identity of an access layer.

In this embodiment, the identity of the access layer may be one of the following identities:

an identity or index assigned by the access layer;

a cell radio network temporary identity (C-RNTI) allocated by a network equipment for the second user equipment;

and a cell radio network temporary identity and a physical cell identity (PCI) allocated by a network equipment for the second user equipment.

Figure 12:
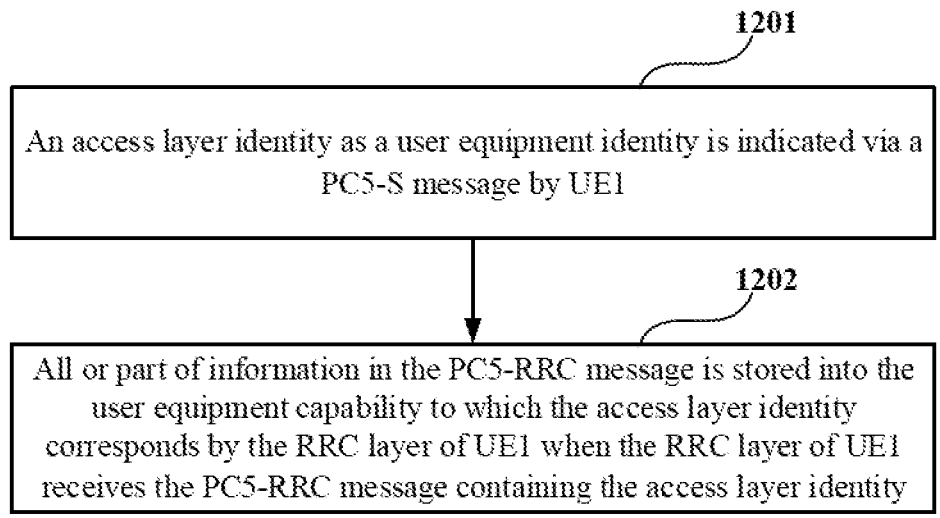
FIG. 12 is a schematic diagram of the identity method of Example 2 of Embodiment 1 of this disclosure.

FIG. 12 is a schematic diagram of the identity method of Example 2 of Embodiment 1 of this disclosure, which is applicable to the UE1 side. As shown in FIG. 12, the method includes:

Step 1201: an access layer identity as a user equipment identity is indicated via a PC5-S message by UE1; and Step 1202: all or part of information in the PC5-RRC message is stored into the user equipment capability to which the access layer identity corresponds by the RRC layer of UE1 when the RRC layer of UE1 receives the PC5-RRC message containing the access layer identity.

Figure 13:
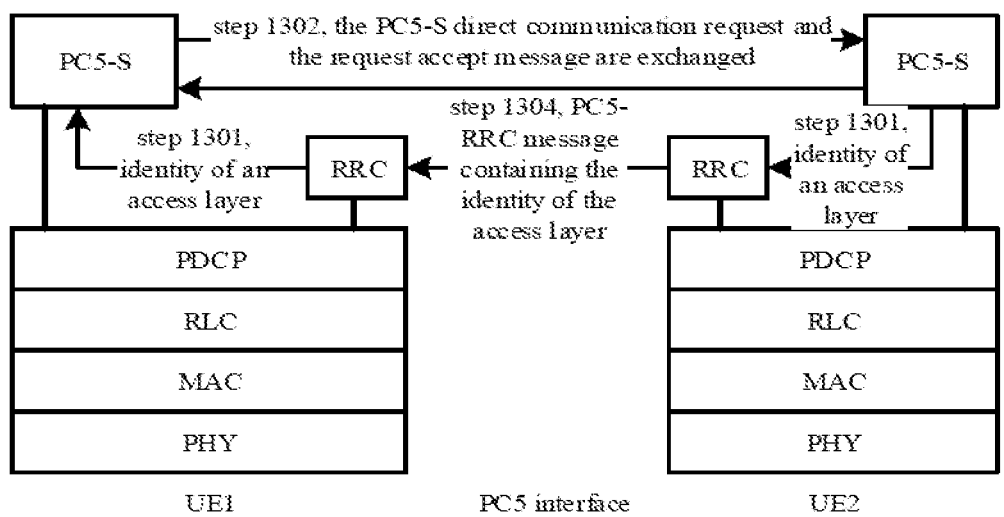
FIG. 13 is a schematic diagram of performing information exchange by the protocol stack of the PC5 interface of Example 2 of Embodiment 1 of this disclosure.

FIG. 13 is a schematic diagram of performing information exchange by the protocol stack of the PC5 interface of Example 2 of Embodiment 1 of this disclosure. As shown in FIG. 13, in step 1301, the RRC layer of UE1 notifies the PC5-S layer of an identity of an access layer; in step 1302, the PC5-S direct communication request and the request accept message are exchanged between UE1 and UE2, where the identity of the access layer is included in the PC5-S message by UE1 and indicated to UE2; in step 1303, the PC5-S layer of UE2 notifies the RRC layer of the identity of the access layer; in step 1304, UE2 transmits a PC5-RRC message containing the identity of the access layer to UE1, such as a message containing user equipment capability information, and the PC5-RRC message explicitly or implicitly contains the identity of the access layer. The RRC layer of UE1 stores all or part of the information in the PC5-RRC message into the user equipment capability to which the identity of the access layer corresponds.

Figure 14:
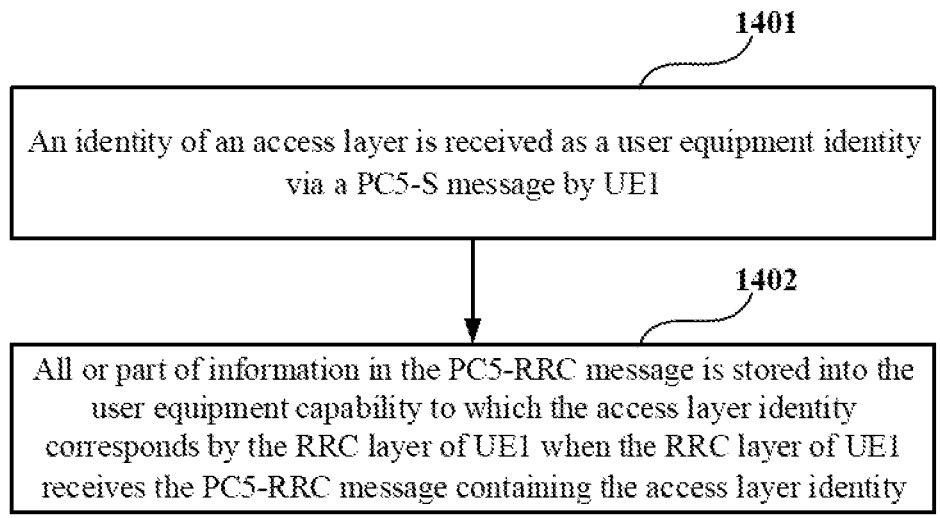
FIG. 14 is another schematic diagram of the identity method of Example 2 of Embodiment 1 of this disclosure.

FIG. 14 is another schematic diagram of the identity method of Example 2 of Embodiment 1 of this disclosure, which is applicable to the UE1 side. As shown in FIG. 14, the method includes:

Step 1401: an identity of an access layer is received as a user equipment identity via a PC5-S message by UE1; and Step 1402: all or part of information in the PC5-RRC message is stored into the user equipment capability to which the access layer identity corresponds by the RRC layer of UE1 when the RRC layer of UE1 receives the PC5-RRC message containing the access layer identity.

Figure 15:
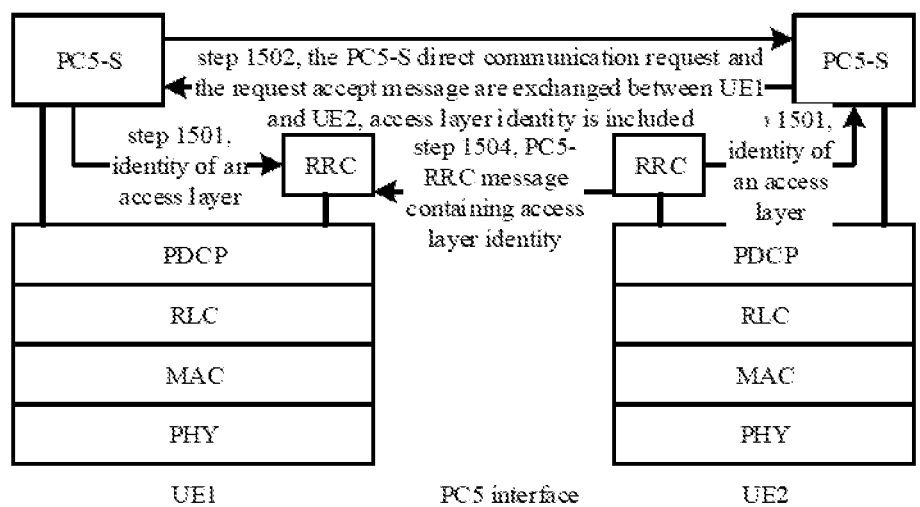
FIG. 15 is another schematic diagram of performing information exchange by the protocol stack of the PC5 interface of Example 2 of Embodiment 1 of this disclosure.

FIG. 15 is another schematic diagram of performing information exchange by the protocol stack of the PC5 interface of Example 2 of Embodiment 1 of this disclosure. As shown in FIG. 15, in step 1501, the RRC layer of UE2 notifies the PC5-S layer of an identity of an access layer; in step 1502, the PC5-S direct communication request and the request accept message are exchanged between UE1 and UE2, where the access layer identity is included in the PC5-S message by UE2 and indicated to UE1, or UE2 takes the access layer identity as the source L2 ID in transmitting the PC5-S message to UE1; in step 1503, the PC5-S layer of UE2 notifies the RRC layer of the access layer identity; in step 1504, UE2 transmits a PC5-RRC message containing the access layer identity to UE1, such as a message containing the UE capability information, and the PC5-RRC message explicitly or implicitly contains the access layer identity. The RRC layer of UE1 stores all or part of the information in the PC5-RRC message into the user equipment capability to which the access layer identity corresponds.

Example 3

The user equipment identity is a source layer 2 identity or an access layer identity used by UE2 in transmitting a PC5-RRC message.

Figure 16:
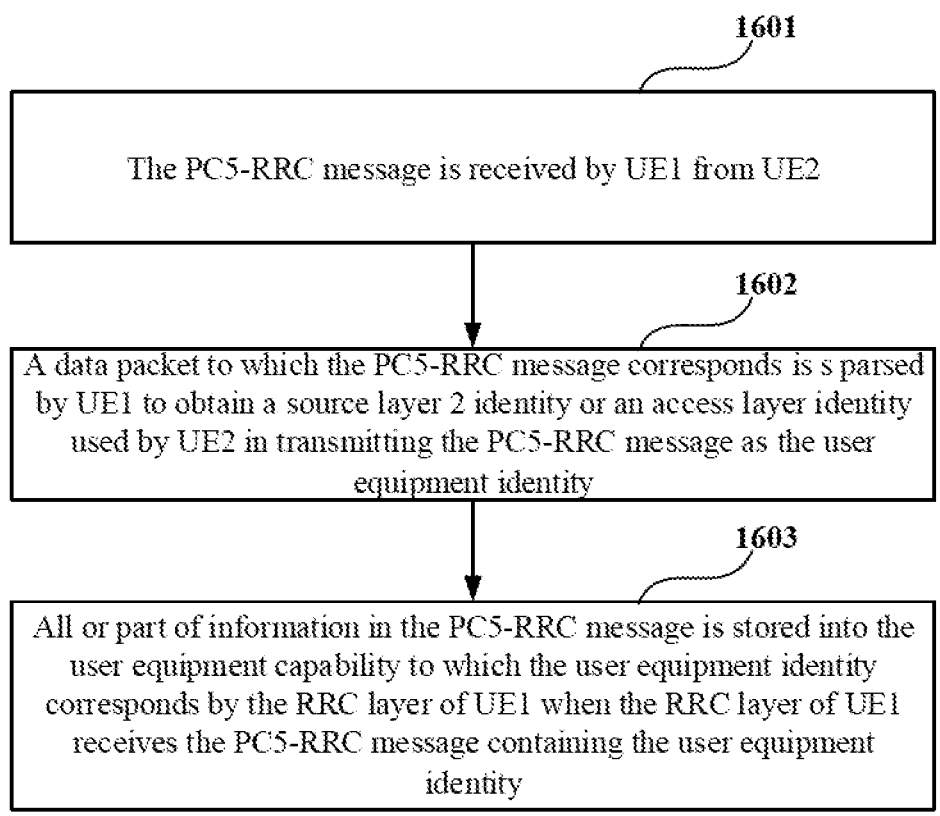
FIG. 16 is another schematic diagram of the identity method of Example 3 of Embodiment 1 of this disclosure.

FIG. 16 is another schematic diagram of the identity method of Example 3 of Embodiment 1 of this disclosure, which is applicable to the UE1 side. As shown in FIG. 16, the method includes:

Step 1601: the PC5-RRC message is received by UE1 from UE2; Step 1602: a data packet to which the PC5-RRC message corresponds is s parsed by UE1 to obtain a source layer 2 identity or an access layer identity used by UE2 in transmitting the PC5-RRC message as the user equipment identity; and Step 1603: all or part of information in the PC5-RRC message is stored into the user equipment capability to which the user equipment identity corresponds by the RRC layer of UE1 when the RRC layer of UE1 receives the PC5-RRC message containing the user equipment identity.

For example, a source layer 2 identity or an access layer identity as the user equipment identity is included in a sub-header of an MAC PDU, and the MAC layer of UE1 notifies an identity to which the PC5-RRC message corresponds to the RRC layer in a process of transmitting the MAC SDU to which the PC5-RRC message containing the user equipment capability information corresponds to the upper layer.

In this embodiment, the process of indicating the user equipment identity may be similar to those in Example 1 and Example 2, which shall not be described herein any further.

The method for acquiring a user equipment identity for identifying a user equipment capability of the second user equipment and a process for identifying in this embodiment are described above by examples 1-3.

In this embodiment, the method may further include:

notifying the RRC layer of at least one piece of the following information by the upper layer of UE1 to generate access layer (AS layer) configuration: a layer 2 identity between UE1 and UE2, an identity pair consisting of a source layer 2 identity (source L2 ID) and a destination layer 2 identity, a link identity, and QoS information of the service to which the destination layer 2 identity and/or an identity pair and/or the link identity corresponds;

generating access layer configuration corresponding to a service or link by the RRC layer of UE1 according to at least one piece of information; and including the generated access layer configuration in the user equipment capability of UE2.

For example, the QoS information of the service may include an identity of a QoS flow to which the service corresponds, PQI (PC5 QoS class indicator), a communication range, and a QoS parameter (including rate information, for example), etc.

Figure 17:
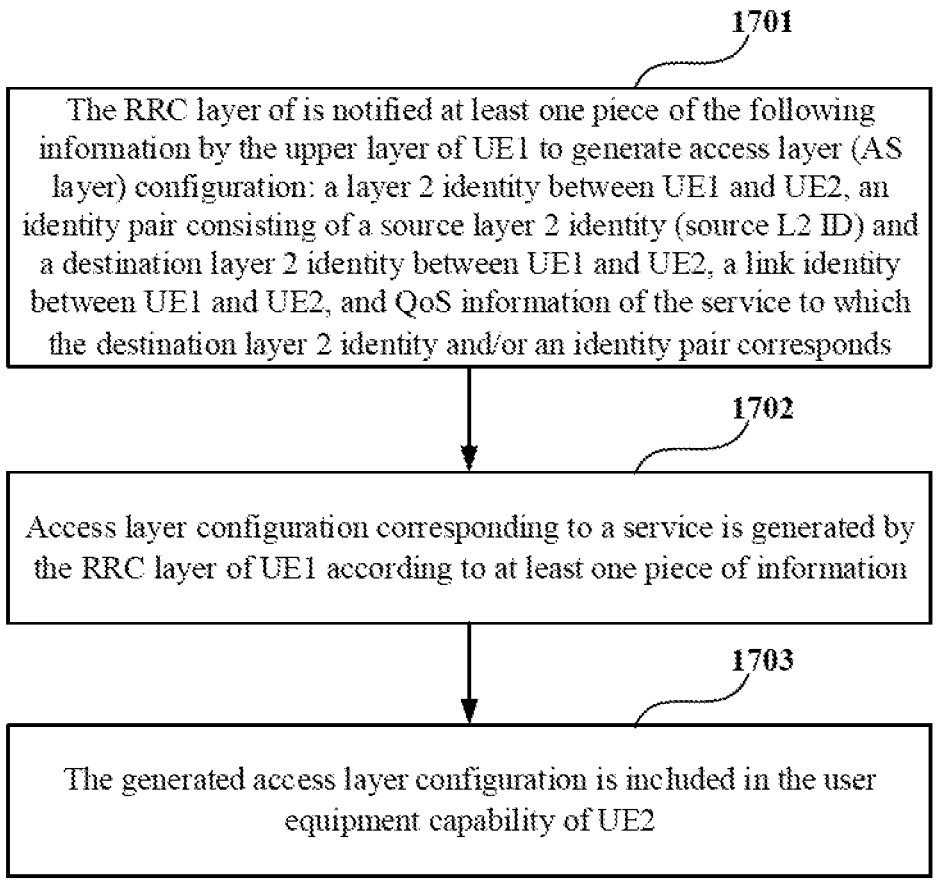
FIG. 17 is a schematic diagram of a method for generating configuration information in sidelink transmission of Embodiment 1 of this disclosure.

In addition, the above steps may also be executed independently. FIG. 17 is a schematic diagram of a method for generating configuration information in sidelink transmission of Embodiment 1 of this disclosure. As shown in FIG. 17, the method includes:

Step 1701: the RRC layer of is notified at least one piece of the following information by the upper layer of UE1 to generate access layer (AS layer) configuration: a layer 2 identity between UE1 and UE2, an identity pair consisting of a source layer 2 identity (source L2 ID) and a destination layer 2 identity between UE1 and UE2, a link identity between UE1 and UE2, and QoS information of the service to which the destination layer 2 identity and/or an identity pair corresponds;

Step 1702: access layer configuration corresponding to a service is generated by the RRC layer of UE1 according to at least one piece of information; and Step 1703: the generated access layer configuration is included in the user equipment capability of UE2.

It can be seen from the above embodiments that by using a specific user equipment identity to identify the UE capability of the destination UE, a transmitting end UE is facilitated to provide configuration not exceeding a UE capability according to the UE capability of a destination UE and maintain information on the destination UE, thereby providing an effective mechanism for identifying a UE capability.

Embodiment 2

Embodiment 2 of this disclosure provides a method for identifying a user equipment capability in sidelink transmission, applicable to a second user equipment side. This method corresponds to the method for identifying a user equipment capability in sidelink transmission in Embodiment 1, with identical contents being not going to be described herein any further.

Figure 18:
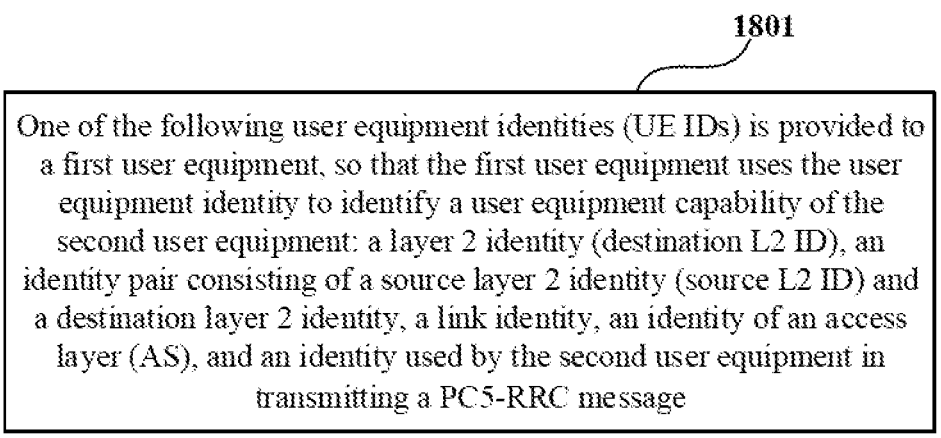
FIG. 18 is a schematic diagram of the method for identifying a user equipment capability in sidelink transmission of Embodiment 2 of this disclosure.

FIG. 18 is a schematic diagram of the method for identifying a user equipment capability in sidelink transmission of Embodiment 2 of this disclosure. As shown in FIG. 18, the method includes:

Step 1801: one of the following user equipment identities (UE IDs) is provided to a first user equipment, so that the first user equipment uses the user equipment identity to identify a user equipment capability of the second user equipment: a layer 2 identity (destination L2 ID), an identity pair consisting of a source layer 2 identity (source L2 ID) and a destination layer 2 identity, a link identity, an identity of an access stratum (AS), and an identity used by the second user equipment in transmitting a PC5-RRC message;

wherein the sidelink transmission is sidelink transmission between the first user equipment and the second user equipment.

In this embodiment, the user equipment identity may be provided by one of the first user equipment, the second user equipment and a network equipment.

In this embodiment, the user equipment identity may be provided by an upper layer or an access layer of the first user equipment or the second user equipment.

In this embodiment, the user equipment identity is explicitly or implicitly contained in a PC5-S message or a PC5-RRC message.

For example, in a case of being explicit, the PC5-S message or PC5-RRC message directly contains the user equipment identity; and in a case of being implicit, the PC5-S message or PC5-RRC message does not directly contain the user equipment identity, instead, it needs to be obtained by parsing an ID to which the message corresponds. For example, the user equipment identity is included by the destination UE in a subheader of an MAC PDU to which the message corresponds.

In this embodiment, corresponding to Example 1 in Embodiment 1, reference may be made to what is contained in the description of UE2 in FIGS. 5, 7, 8, 9 and 11 in Embodiment 1 for particular steps, which shall not be described herein any further.

For example, the user equipment identity is a layer 2 identity or an identity pair consisting of a source layer 2 identity and a destination layer 2 identity or a link identity. In this case, the method may further include: transmitting the source layer 2 identity of the second user equipment to the first user equipment via the PC5-S message.

In this embodiment, the user equipment identity may be one of more than one layer 2 identities, or one of more than one of the identity pairs, or one of more than one link identities, provided by the upper layer of the first user equipment or the second user equipment. In this case, the method may further include: determining the user equipment identity by the upper layer or RRC layer of the second user equipment, and indicating the user equipment identity by the second user equipment via the PC5-S message or PC5-RRC message.

In this embodiment, for a case of establishing a new link and/or service by the PC5-S after UE1 and UE2 exchanges the UE capability, the method may further include: notifying the user equipment identity to the upper layer by the RRC layer of the second user equipment; and indicating the user equipment identity to the first user equipment by the second user equipment via the PC5-S message.

In this embodiment, corresponding to Example 2 in Embodiment 1, reference may be made to what is contained in FIGS. 13 and 15 for steps executed by UE2, which shall not be described herein any further.

In this embodiment, corresponding to Example 3 in Embodiment 1, reference may be made to the description of UE2 in Example 3 in Embodiment 1, which shall not be described herein any further.

It can be seen from the above embodiments that by using a specific user equipment identity to identify the UE capability of the destination UE, a transmitting end UE is facilitated to provide configuration not exceeding a UE capability according to the UE capability of a destination UE and maintain information on the destination UE, thereby providing an effective mechanism for identifying a UE capability.

Embodiment 3

Embodiment 3 of this disclosure provides a method for identifying a user equipment capability in sidelink transmission, applicable to a first user equipment side and a second user equipment side. This method corresponds to Embodiment 1 and Embodiment 2, with identical contents being not going to be described herein any further.

Figure 19:
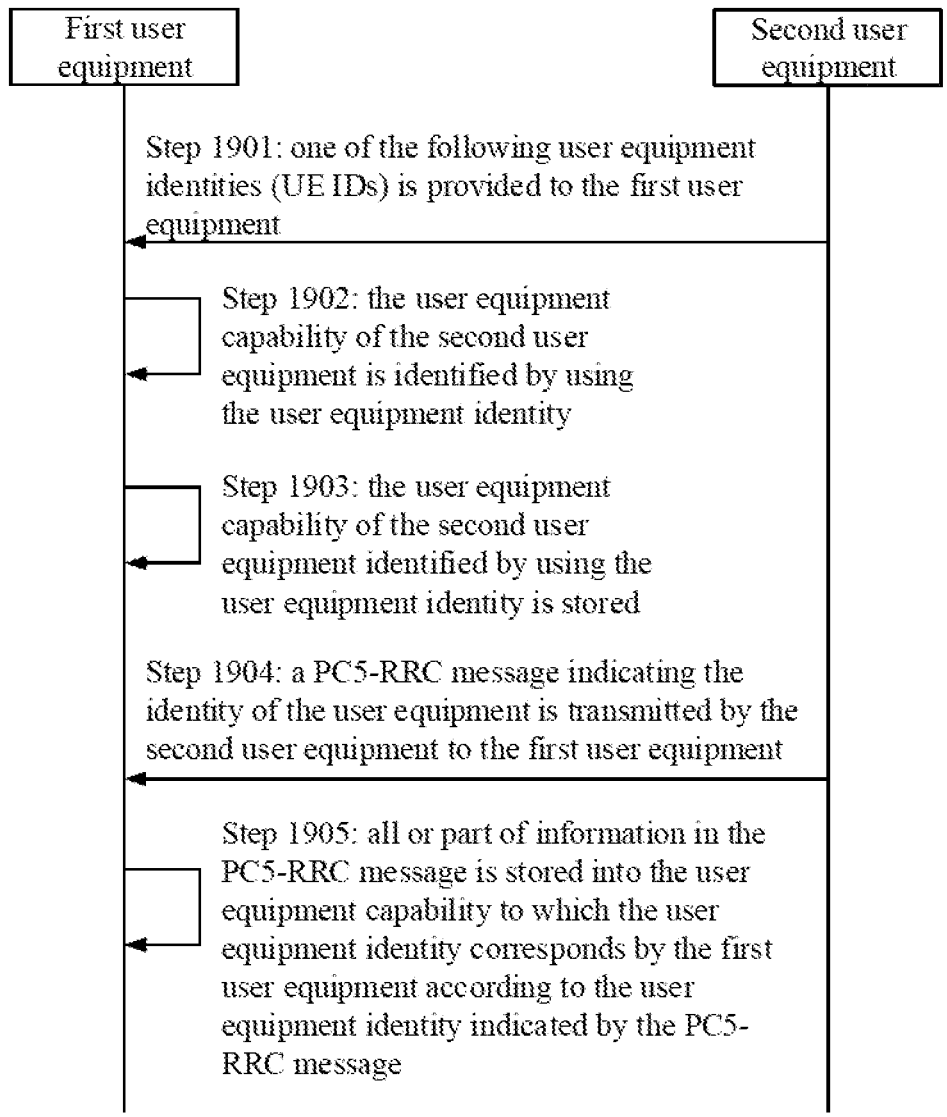
FIG. 19 is a schematic diagram of the method for identifying a user equipment capability in sidelink transmission of Embodiment 3 of this disclosure.

FIG. 19 is a schematic diagram of the method for identifying a user equipment capability in sidelink transmission of Embodiment 9 of this disclosure. As shown in FIG. 19, the method includes:

Step 1901: one of the following user equipment identities (UE IDs) is provided to the first user equipment: a layer 2 identity (destination L2 ID); an identity pair consisting of a source layer 2 identity (source L2 ID) and a destination layer 2 identity, a link identity, an access layer (AS layer) identity, and an identity used by the second user equipment in transmitting a PC5-RRC message;

Step 1902: the user equipment capability of the second user equipment is identified by using the user equipment identity;

Step 1903: the user equipment capability of the second user equipment identified by using the user equipment identity is stored; Step 1904: a PC5-RRC message indicating the user equipment identity is transmitted by the second user equipment to the first user equipment; and Step 1905: all or part of information in the PC5-RRC message is stored into the user equipment capability to which the user equipment identity corresponds by the first user equipment according to the user equipment identity indicated by the PC5-RRC message.

In this embodiment, reference may be made to what is contained in Embodiment 1 for a method for acquiring the user equipment identity and an identity process, which shall not be described herein any further.

It can be seen from the above embodiments that by using a specific user equipment identity to identify the UE capability of the destination UE, a transmitting end UE is facilitated to provide configuration not exceeding a UE capability according to the UE capability of a destination UE and maintain information on the destination UE, thereby providing an effective mechanism for identifying a UE capability.

Embodiment 4

Embodiment 4 of this disclosure provides an apparatus for identifying a user equipment capability (UE capability) in sidelink transmission, configured at a first user equipment side. As a principle of the apparatus for solving problems is similar to that of the method of Embodiment 1, reference may be made to the implementation of the method in Embodiment 1 for implementation of this apparatus, with identical parts being not going to be described herein any further.

Figure 20:
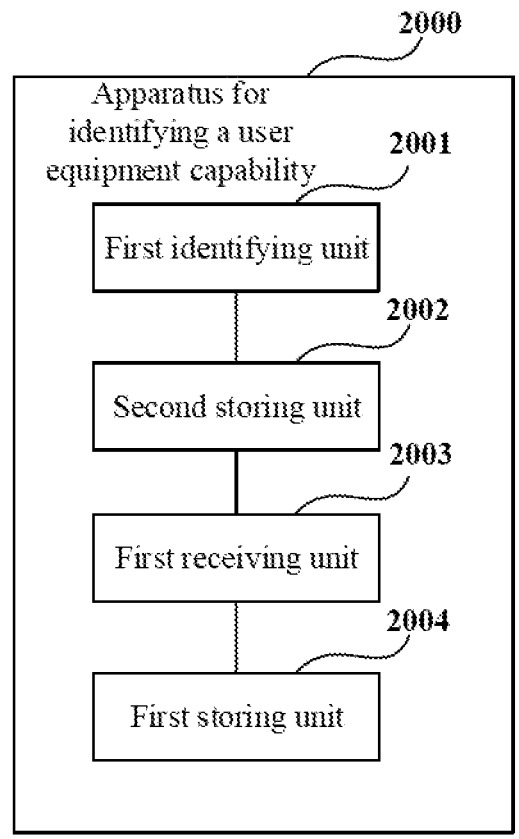
FIG. 20 is a schematic diagram of the apparatus for identifying a user equipment capability (UE capability) in sidelink transmission of Embodiment 4 of this disclosure.

FIG. 20 is a schematic diagram of the apparatus for identifying a user equipment capability (UE capability) in sidelink transmission of Embodiment 4 of this disclosure. As shown in FIG. 20, an apparatus 2000 includes:

a first identifying unit 2001 configured to identify a user equipment capability of a second user equipment by using one of the following user equipment identities (UE IDs): a layer 2 identity (L2 ID), an identity pair consisting of a source layer 2 identity (source L2 ID) and a destination layer 2 identity, an identity of an access layer (AS layer), a link identity, and an identity used by the second user equipment in transmitting a PC5-RRC message;

wherein the sidelink transmission is sidelink transmission between the first user equipment and the second user equipment.

In this embodiment, the apparatus 2000 may further include:
  a second storing unit 2002 configured to store the user equipment capability of the second user equipment identified by using the user equipment identity.

Furthermore, the apparatus 2000 may include:
  a first receiving unit 2003 configured to receive the PC5-RRC message from the second user equipment; and
  a first storing unit 2004 configured to store all or part of information in the PC5-RRC message into a user equipment capability to which the user equipment identity corresponds according to the user equipment identity indicated by the PC5-RRC message.

In this embodiment, reference may be made to what is contained in Embodiment 1 for a method for acquiring the user equipment identity and a method for identifying the user equipment capability of the user equipment by using the user equipment identity, which shall not be described herein any further.

It can be seen from the above embodiments that by using a specific user equipment identity to identify the UE capability of the destination UE, a transmitting end UE is facilitated to provide configuration not exceeding a UE capability according to the UE capability of a destination UE and maintain information on the destination UE, thereby providing an effective mechanism for identifying a UE capability.

Embodiment 5

Embodiment 5 of this disclosure provides an apparatus for identifying a user equipment capability (UE capability) in sidelink transmission, configured at a second user equipment side. As a principle of the apparatus for solving problems is similar to that of the method of Embodiment 2, reference may be made to the implementation of the method in Embodiment 2 for implementation of this apparatus, with identical parts being not going to be described herein any further.

Figure 21:
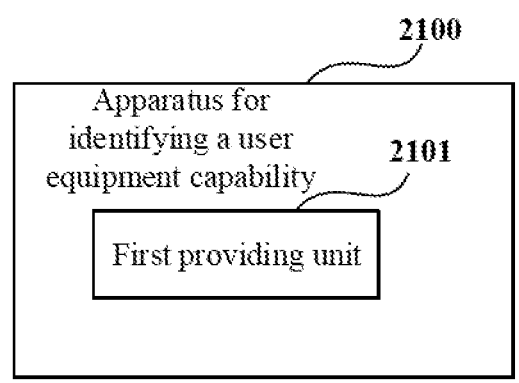
FIG. 21 is a schematic diagram of the apparatus for identifying a user equipment capability (UE capability) in sidelink transmission of Embodiment 5 of this disclosure.

FIG. 21 is a schematic diagram of the apparatus for identifying a user equipment capability (UE capability) in sidelink transmission of Embodiment 5 of this disclosure. As shown in FIG. 21, an apparatus 2100 includes:

a first providing unit 2101 configured to provide one of the following user equipment identities (UE IDs) to a first user equipment, so that the first user equipment uses the user equipment identity to identify a user equipment capability of the second user equipment: a layer 2 identity (destination L2

ID), an identity pair consisting of a source layer 2 identity (source L2 ID) and a destination layer 2 identity, a link identity, an identity of an access layer (AS), and an identity used by the second user equipment in transmitting a PC5-RRC message;

wherein the sidelink transmission is sidelink transmission between the first user equipment and the second user equipment.

In this embodiment, reference may be made to Embodiment 1 and Embodiment 2 for a method for providing a user equipment identity to the first user equipment by the first providing unit 2101, which shall not be described herein any further.

It can be seen from the above embodiments that by using a specific user equipment identity to identify the UE capability of the destination UE, a transmitting end UE is facilitated to provide configuration not exceeding a UE capability according to the UE capability of a destination UE and maintain information on the destination UE, thereby providing an effective mechanism for identifying a UE capability.

Embodiment 6

The embodiment of this disclosure provides a user equipment, including the apparatus for identifying a user equipment capability (UE capability) in sidelink transmission as described in Embodiment 4.

Figure 22:
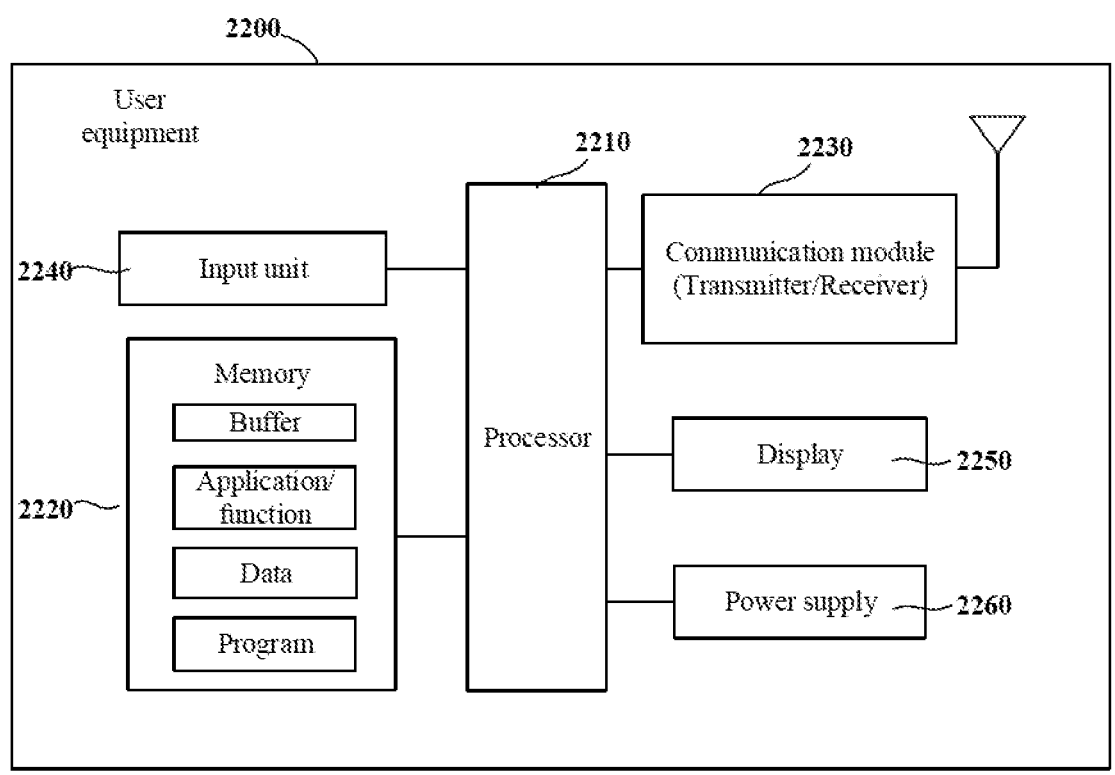
FIG. 22 is a block diagram of a systematic structure of the user equipment Embodiment 6 of this disclosure.

FIG. 22 is a block diagram of a systematic structure of the user equipment of Embodiment 6 of this disclosure. As shown in FIG. 22, a user equipment 2200 may include a processor 2210 and a memory 2220, the memory 2220 being coupled to the processor 2210. It should be noted that this figure is illustrative only, and other types of structures may also be used, so as to supplement or replace this structure and achieve a telecommunications function or other functions.

In one implementation, the functions of the apparatus for identifying a user equipment capability (UE capability) in sidelink transmission may be integrated into the processor 2210.

In this embodiment, the processor 2210 may be configured to: identify a user equipment capability of a second user equipment by using one of the following user equipment identities (UE IDs): a layer 2 identity (L2 ID), an identity pair consisting of a source layer 2 identity (source L2 ID) and a destination layer 2 identity, an identity of an access layer (AS layer), a link identity, and an identity used by the second user equipment in transmitting a PC5-RRC message; wherein the sidelink transmission is sidelink transmission between the first user equipment and the second user equipment.

In another implementation, the apparatus for identifying a user equipment capability (UE capability) in sidelink transmission and the processor 2210 may be configured separately; for example, the apparatus for identifying a user equipment capability (UE capability) in sidelink transmission may be configured as a chip connected to the processor 2210, and the functions of the apparatus for identifying a user equipment capability (UE capability) in sidelink transmission are executed under control of the processor 2210.

As shown in FIG. 22, the user equipment 2200 may further include a communication module 2230, an input unit 2240, a display 2250, and a power supply 2260, etc. It should be noted that the user equipment 2200 does not necessarily include all the parts shown in FIG. 22. Furthermore, the user equipment 2200 may include parts not shown in FIG. 22, and the related art may be referred to.

As shown in FIG. 22, the processor 2210 is sometimes referred to as a controller or an operational control, which may include a microprocessor or other processor devices and/or logic devices. The processor 2210 receives input and controls operations of components of the user equipment 2200.

In this embodiment, the memory 2220 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 2210 may execute programs stored in the memory 2220, so as to realize information storage or processing, etc. Functions of other parts are similar to those of the related art, which shall not be described herein any further. The parts of the user equipment 2200 may be realized by specific hardware, firmware, software, or any combination thereof, without departing from the scope of this disclosure.

It can be seen from the above embodiment that by using a specific user equipment identity to identify the UE capability of the destination UE, a transmitting end UE is facilitated to provide configuration not exceeding a UE capability according to the UE capability of a destination UE and maintain information on the destination UE, thereby providing an effective mechanism for identifying a UE capability.

Embodiment 7

The embodiment of this disclosure provides a user equipment, including the apparatus for identifying a user equipment capability (UE capability) in sidelink transmission as described in Embodiment 5.

Figure 23:
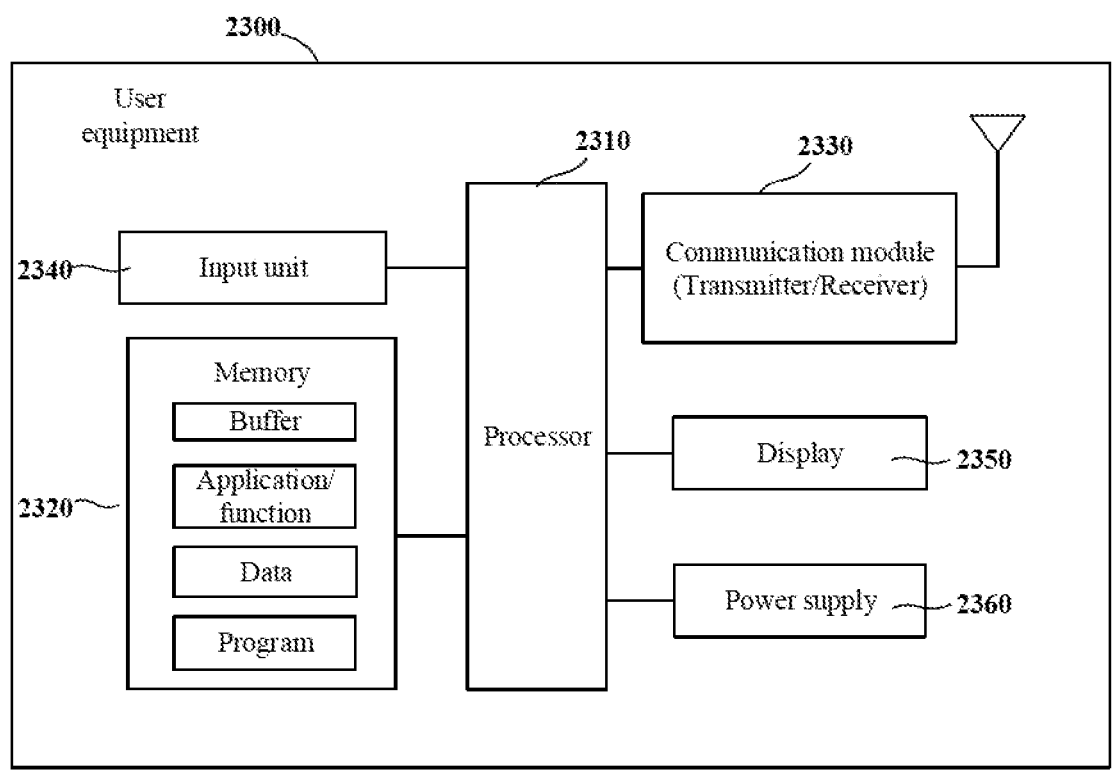
FIG. 23 is a block diagram of a systematic structure of the user equipment Embodiment 7 of this disclosure.

FIG. 23 is a block diagram of a systematic structure of the user equipment of Embodiment 7 of this disclosure. As shown in FIG. 23, a user equipment 2300 may include a processor 2310 and a memory 2320, the memory 2320 being coupled to the processor 2310. It should be noted that this figure is illustrative only, and other types of structures may also be used, so as to supplement or replace this structure and achieve a telecommunications function or other functions.

In one implementation, the functions of the apparatus for identifying a user equipment capability (UE capability) in sidelink transmission may be integrated into the processor 2310.

In this embodiment, the processor 2310 may be configured to: provide one of the following user equipment identities (UE IDs) to a first user equipment, so that the first user equipment uses the user equipment identity to identify a user equipment capability of the second user equipment: a layer 2 identity (destination L2 ID), an identity pair consisting of a source layer 2 identity (source L2 ID) and a destination layer 2 identity, a link identity, an identity of an access layer (AS), and an identity used by the second user equipment in transmitting a PC5-RRC message; wherein the sidelink transmission is sidelink transmission between the first user equipment and the second user equipment.

In another implementation, the apparatus for identifying a user equipment capability (UE capability) in sidelink transmission and the processor 2310 may be configured separately; for example, the apparatus for identifying a user equipment capability (UE capability) in sidelink transmission may be configured as a chip connected to the processor 2310, and the functions of the apparatus for identifying a user equipment capability (UE capability) in sidelink transmission are executed under control of the processor 2310.

As shown in FIG. 23, the user equipment 2300 may further include a communication module 2330, an input unit 2340, a display 2350, and a power supply 2360, etc. It should be noted that the user equipment 2300 does not necessarily include all the parts shown in FIG. 23. Furthermore, the user equipment 2300 may include parts not shown in FIG. 23, and the related art may be referred to.

As shown in FIG. 23, the processor 2310 is sometimes referred to as a controller or an operational control, which may include a microprocessor or other processor devices and/or logic devices. The processor 2310 receives input and controls operations of components of the user equipment 2300.

In this embodiment, the memory 2320 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 2310 may execute programs stored in the memory 2320, so as to realize information storage or processing, etc. Functions of other parts are similar to those of the related art, which shall not be described herein any further. The parts of the user equipment 2300 may be realized by specific hardware, firmware, software, or any combination thereof, without departing from the scope of this disclosure.

It can be seen from the above embodiment that by using a specific user equipment identity to identify the UE capability of the destination UE, a transmitting end UE is facilitated to provide configuration not exceeding a UE capability according to the UE capability of a destination UE and maintain information on the destination UE, thereby providing an effective mechanism for identifying a UE capability.

Embodiment 8

The embodiment of this disclosure provides a communication system, including the user equipment described in Embodiment 6 and the user equipment described in Embodiment 7.

For example, reference may be made to FIG. 1 for a structure of the communication system. As shown in FIG. 1, the communication system 100 includes a network equipment 101 and user equipments 102, 103 and 104. The user equipment 102 may be identical to the user equipment in Embodiment 6, and the user equipments 103 and 104 may be identical to the user equipment in Embodiment 7, with repeated parts being not going to be described herein any further.

Furthermore, the network equipment 101 is optional.

It can be seen from the above embodiment that by using a specific user equipment identity to identify the UE capability of the destination UE, a transmitting end UE is facilitated to provide configuration not exceeding a UE capability according to the UE capability of a destination UE and maintain information on the destination UE, thereby providing an effective mechanism for identifying a UE capability.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 20 may either correspond to software modules of procedures of a computer program, or correspond to hardware modules. Such software modules may respectively correspond to the steps shown in FIG. 3. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 20 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 20 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations including the above embodiments, following supplements are further disclosed.

1. An apparatus for identifying a user equipment capability (UE capability) in sidelink transmission, applicable to a first user equipment side, the apparatus including:
a first identifying unit configured to identify a user equipment capability of a second user equipment by using one of the following user equipment identities (UE IDs): a layer 2 identity (L2 ID), an identity pair consisting of a source layer 2 identity (source L2 ID) and a destination layer 2 identity, an identity of an access layer (AS layer), a link identity, and an identity used by the second user equipment in transmitting a PC5-RRC message;

wherein the sidelink transmission is sidelink transmission between the first user equipment and the second user equipment.

2. The apparatus according to supplement 1, wherein, the user equipment identity is provided by one of the first user equipment, the second user equipment and the network equipment.

3. The apparatus according to supplement 1, wherein, the user equipment identity is provided by an upper layer or an access stratum of the first user equipment or the second user equipment.

4. The apparatus according to supplement 1, wherein, the user equipment identity is explicitly or implicitly contained in a PC5-S message or a PC5-RRC message.

5. The apparatus according to any one of supplements 1-4, wherein the apparatus further includes:

a first receiving unit configured to receive the PC5-RRC message from the second user equipment; and a first storing unit configured to store all or part of information in the PC5-RRC message into a user equipment capability to which the user equipment identity corresponds according to the user equipment identity indicated by the PC5-RRC message.

6. The apparatus according to any one of supplements 1-4, wherein, the user equipment identity is a layer 2 identity or an identity pair consisting of a source layer 2 identity and a destination layer 2 identity or a link identity provided by an upper layer of the first user equipment or the second user equipment.

7. The apparatus according to supplement 6, wherein the apparatus further includes:

a second receiving unit configured to receive a PC5-S message transmitted by the second user equipment by using a layer 2 identity of the second user equipment as a source layer 2 identity; and a first notifying unit configured to make the upper layer of the first user equipment notify an RRC layer of a layer 2 identity of the second user equipment taken as a layer 2 identity identifying a user equipment capability of the second user equipment.

8. The apparatus according to any one of supplements 1-4, wherein, the user equipment identity is one of more than one layer 2 identities or one of more than one identity pairs or one of more than one link identities provided by the upper layer of the first user equipment or the second user equipment.

9. The apparatus according to supplement 8, wherein the apparatus further includes:

a first indicating unit configured to make the first user equipment indicate the user equipment identity via a PC5-S message or a PC5-RRC message.

10. The apparatus according to supplement 9, wherein the apparatus further includes:

a first determining unit configured to make the upper layer or RRC layer of the first user equipment determine the user equipment identity.

11. The apparatus according to supplement 8, wherein in a case where the first the user equipment and the second user equipment exchange a UE capability, the apparatus further includes:

a second receiving unit configured to make the upper layer of the first user equipment receive the user equipment identity identifying the user equipment capability of the second user equipment via the PC5-S message; and a second notifying unit configured to notify the user equipment identity to the RRC layer by using the upper layer of the first user equipment.

12. The apparatus according to any one of supplements 1-4, wherein the apparatus further includes:

a second indicating unit configured to make the first user equipment indicate via a PC5-S message that an identity of an access layer is taken as the user equipment identity.

13. The apparatus according to supplement 12, wherein, the identity of the access layer taken as the user equipment identity is one of the following identities:

an identity or index assigned by the access layer;

a cell radio network temporary identity (C-RNTI) allocated by a network equipment for the second user equipment;

and a cell radio network temporary identity and a physical cell identity (PCI) allocated by a network equipment for the second user equipment.

14. The apparatus according to any one of supplements 1-4, wherein, the user equipment identity is a source layer 2 identity or access layer identity used by the second user equipment in transmitting the PC5-RRC message.

15. The apparatus according to supplement 14, wherein the apparatus further includes:

a third receiving unit configured to make the first user equipment receive the PC5-RRC message from the second user equipment; and a first parsing unit configured to make the first user equipment parse the PC5-RRC message to obtain a source layer 2 identity or an identity of an access layer taken as the user equipment identity.

16. The apparatus according to supplement 15, wherein, the source layer 2 identity or identity of an access layer taken as the user equipment identity is contained in a sub-header of an MAC PDU.

17. The apparatus according to any one of supplements 1-4, wherein the apparatus further includes:

a second storing unit configured to store the user equipment capability of the second user equipment identified by using the user equipment identity.

18. The apparatus according to any one of supplements 1-4, wherein the apparatus further includes:

a third notifying unit configured to make the upper layer of the first user equipment notify the RRC layer of at least one piece of the following information to generate access layer (AS layer) configuration:

a layer 2 identity between UE1 and UE2;

an identity pair consisting of a source layer 2 identity (source L2 ID) and a destination layer 2 identity; and QoS information of the service to which the destination layer 2 identity and/or the identity pair corresponds.

19. The apparatus according to supplement 18, wherein the apparatus further includes:

a first generating unit configured to make the RRC layer of the first user equipment generate access layer configuration to which the service corresponds according to at least one piece of the information.

20. The apparatus according to supplement 19, wherein the apparatus further includes:

a first configuring unit configured to include the generated access layer configuration in the user equipment capability of the second user equipment.

21. An apparatus for generating configuration information in sidelink transmission, applicable to a first user equipment side, the apparatus including:
a third notifying unit configured to make an upper layer of the first user equipment notify an RRC layer of at least one piece of the following information to generate access layer (AS layer) configuration:
a layer 2 identity between the first user equipment and a second user equipment;
an identity pair consisting of a source layer 2 identity and a destination layer 2 identity between the first user equipment and the second user equipment; and
QoS information of the service to which the destination layer 2 identity and/or the identity pair corresponds;
wherein the sidelink transmission is sidelink transmission between the first user equipment and the second user equipment.

22. The apparatus according to supplement 21, wherein the apparatus further includes:
a first generating unit configured to make the RRC layer of the first user equipment generate access layer configuration to which the service corresponds according to at least one piece of the information.

23. The apparatus according to supplement 21, wherein the apparatus further includes:
a first configuring unit configured to include the generated access layer configuration in a user equipment capability of the second user equipment.

24. An apparatus for identifying a user equipment capability (UE capability) in sidelink transmission, applicable to a second user equipment side, the apparatus including:
a first providing unit configured to provide one of the following user equipment identities (UE IDs) to a first user equipment, so that the first user equipment uses the user equipment identity to identify a user equipment capability of the second user equipment: a layer 2 identity (destination L2 ID), an identity pair consisting of a source layer 2 identity (source L2 ID) and a destination layer 2 identity, a link identity, an identity of an access layer (AS), and an identity used by the second user equipment in transmitting a PC5-RRC message;
wherein the sidelink transmission is sidelink transmission between the first user equipment and the second user equipment.

25. The apparatus according to supplement 24, wherein, the user equipment identity is provided by one of the first user equipment, the second user equipment and a network equipment.

26. The apparatus according to supplement 24, wherein, the user equipment identity is provided by an upper layer or an access layer of the first user equipment or the second user equipment.

27. The apparatus according to supplement 24, wherein, the user equipment identity is explicitly or implicitly contained in a PC5-S message or a PC5-RRC message.

28. The apparatus according to any one of supplements 24-27, wherein,
the user equipment identity is a layer 2 identity, or an identity pair consisting of a source layer 2 identity and a destination layer 2 identity, or a link identity, provided by the upper layer of the first user equipment or the second user equipment.

29. The apparatus according to supplement 28, wherein the apparatus further includes:
a second transmitting unit configured to make the second user equipment transmit the source layer 2 identity of the user equipment to the first user equipment via a PC5-S message.

30. The apparatus according to any one of supplements 24-27, wherein,
the user equipment identity is one of more than one layer 2 identities, or one of more than one of the identity pairs, or one of more than one link identities, provided by the upper layer of the first user equipment or the second user equipment.

31. The apparatus according to supplement 30, wherein the apparatus further includes:
a third indicating unit configured to make the second user equipment indicate the user equipment identity via a PC5-S message or a PC5-RRC message.

32. The apparatus according to supplement 31, wherein the apparatus further includes:
a second determining unit configured to make the upper layer or the RRC layer of the second user equipment determine the user equipment identity.

33. The apparatus according to supplement 30, wherein the apparatus further includes:
a fourth indicating unit configured to, in a case where the first user equipment and the second user equipment exchange a user equipment capability, make the second user equipment indicate the user equipment identity to the first user equipment via a PC5-S message.

34. The apparatus according to supplement 33, wherein the apparatus further includes:
a fourth notifying unit configured to make an RRC layer of the second user equipment notify the user equipment identity to the upper layer.

35. A user equipment, including the apparatus as described in any one of supplements 1-34.

What is claimed is:

1. An apparatus for identifying a user equipment capability (UE capability) in sidelink transmission, applicable to a first user equipment side, the apparatus comprising:
first identifying circuitry configured to identify a user equipment capability of a second user equipment by using following user equipment identity (UE ID): an identity pair consisting of a source layer 2 identity (source L2 ID) and a destination layer 2 identity (destination L2 ID);
wherein the sidelink transmission is sidelink transmission between the first user equipment and the second user equipment,
wherein, the identity pair consists of a source layer 2 identity and a destination layer 2 identity and is provided by V2X layer to RRC layer of the first user equipment or the second user equipment.

2. The apparatus according to claim 1, wherein, the user equipment identity is explicitly or implicitly contained in a PC5-S message or a PC5-RRC message.

3. The apparatus according to claim 1, wherein the apparatus further comprises:
processor circuitry configured to:
receive the PC5-RRC message from the second user equipment; and
store all or part of information in the PC5-RRC message into a user equipment capability to which the user equipment identity corresponds according to the user equipment identity indicated by the PC5-RRC message.

4. The apparatus according to claim 2, wherein, the PC5-RRC message is initiated after its corresponding PC5 unicast link establishment in PC5 signalling.

5. An apparatus for identifying a user equipment capability (UE capability) in sidelink transmission, applicable to a second user equipment side, the apparatus comprising:
first providing circuitry configured to provide the following user equipment identity (UE ID) to a first user equipment, so that the first user equipment uses the user equipment identity to identify a user equipment capability of the second user equipment: an identity pair consisting of a source layer 2 identity (source L2 ID) and a destination layer 2 identity (destination L2 ID);
wherein the sidelink transmission is sidelink transmission between the first user equipment and the second user equipment,
wherein, identity pair consists of a source layer 2 identity and a destination layer 2 identity and is provided by V2X layer to RRC layer of the first user equipment or the second user equipment.

6. The apparatus according to claim 5, wherein, the user equipment identity is provided by one of the first user equipment, the second user equipment and a network equipment.

7. The apparatus according to claim 5, wherein, the user equipment identity is explicitly or implicitly contained in a PC5-S message or a PC5-RRC message.

8. The apparatus according to claim 5, wherein,
the user equipment identity is one of more than one of the identity pairs provided by the upper layer of the first user equipment or the second user equipment.

9. The apparatus according to claim 8, wherein the apparatus further comprises:
processor circuitry configured to:
make the second user equipment indicate the user equipment identity via a PC5-S message or a PC5-RRC message.

10. The apparatus according to claim 9, wherein the apparatus further comprises:
processor circuitry configured to:
make the upper layer or the RRC layer of the second user equipment determine the user equipment identity.

11. The apparatus according to claim 8, wherein the apparatus further comprises:
processor circuit figured to:
in a case where the first user equipment and the second user equipment exchange a user equipment capability, make the second user equipment indicate the user equipment identity to the first user equipment via a PC5-S message.

12. The apparatus according to claim 2, wherein the apparatus further comprises:
processor circuitry configured to:
receive the PC5-RRC message from the second user equipment; and
store all or part of information in the PC5-RRC message into a user equipment capability to which the user equipment identity corresponds according to the user equipment identity indicated by the PC5-RRC message.

13. The apparatus according to claim 6, wherein,
the user equipment identity is one of more than one of the identity pairs provided by the upper layer of the first user equipment or the second user equipment.

14. The apparatus according to claim 7, wherein,
the user equipment identity is one of more than one of the identity pairs provided by the upper layer of the first user equipment or the second user equipment.

* * * * *